(12) United States Patent
Chea et al.

(10) Patent No.: US 7,937,391 B2
(45) Date of Patent: May 3, 2011

(54) CONSUMER PRODUCT REVIEW SYSTEM USING A COMPARISON CHART

(75) Inventors: Robert S. Chea, San Mateo, CA (US); James Morris, San Francicso, CA (US); Gautam Prabhu, San Francisco, CA (US)

(73) Assignee: PowerReviews, Inc., Millbrae, CA (US)

( * ) Notice: Subject to any disclaimer, the term of this patent is extended or adjusted under 35 U.S.C. 154(b) by 0 days.

(21) Appl. No.: 12/575,401

(22) Filed: Oct. 7, 2009

(65) Prior Publication Data

US 2010/0114883 A1 May 6, 2010

Related U.S. Application Data

(63) Continuation of application No. 11/474,097, filed on Jun. 22, 2006, now Pat. No. 7,620,651.

(60) Provisional application No. 60/741,413, filed on Dec. 1, 2005, provisional application No. 60/736,969, filed on Nov. 15, 2005.

(51) Int. Cl.
*G06F 7/00* (2006.01)
*G06F 17/30* (2006.01)

(52) U.S. Cl. ........... 707/736; 707/758; 707/805; 705/10
(58) Field of Classification Search .................. 707/736, 707/999.102, 758, 805; 705/10
See application file for complete search history.

(56) References Cited

U.S. PATENT DOCUMENTS

| | | | |
|---|---|---|---|
| 6,212,517 B1 | 4/2001 | Sato et al. | |
| 6,405,175 B1 * | 6/2002 | Ng | 705/14.26 |
| 6,631,184 B1 | 10/2003 | Weiner | |
| 6,785,671 B1 | 8/2004 | Bailey et al. | |
| 6,963,848 B1 | 11/2005 | Brinkerhoff | |
| 7,076,454 B2 * | 7/2006 | Kim | 705/26 |
| 2001/0039517 A1 * | 11/2001 | Kawakatsu | 705/26 |
| 2001/0047290 A1 | 11/2001 | Petras et al. | |
| 2002/0002502 A1 * | 1/2002 | Maes et al. | 705/26 |
| 2002/0062302 A1 | 5/2002 | Oosta | |
| 2002/0165905 A1 * | 11/2002 | Wilson | 709/203 |
| 2002/0184108 A1 | 12/2002 | Hatakama et al. | |
| 2003/0103070 A1 * | 6/2003 | Tiongson et al. | 345/700 |
| 2004/0073625 A1 | 4/2004 | Chatani | |

(Continued)

OTHER PUBLICATIONS

MSN Autos, "side-by-side compare", Mar. 5, 2005, 6 pages, retrieved from http://web.archive.org/web/20050305221048/autos.msn.com/research/compare/default.aspx?src=compgtwy&n=3&v=t98177&v=t97190.*

(Continued)

*Primary Examiner* — John Breene
*Assistant Examiner* — Phong Nguyen
(74) *Attorney, Agent, or Firm* — Trellis IP Law Group, PC

(57) ABSTRACT

A system for presenting keywords obtained from users in a review process. The keywords are displayed along with a use value that reflects the number of times users have voted or selected the keyword as being relevant or effective in a review of a product. The keywords can be used to assist consumers in deciding whether to purchase a product or a service, in determining a brand's reputation, or for other purposes. Keywords can be ranked according to usage criteria such as the frequency of use of the keyword in reviews, the reputation of a user/reviewer who created or used the keyword, etc. Rankings can be dynamically updated when keyword usage changes. Such as when a keyword declines in popularity, when words change in meaning or become obsolete or irrelevant with respect to their original intent, etc. Keywords can be used as filters for product searches.

11 Claims, 6 Drawing Sheets

U.S. PATENT DOCUMENTS

| | | |
|---|---|---|
| 2004/0230511 A1 | 11/2004 | Kannan et al. |
| 2005/0038775 A1 | 2/2005 | Haveliwala |
| 2005/0125221 A1 | 6/2005 | Brown et al. |
| 2005/0198068 A1 | 9/2005 | Mukherjee et al. |
| 2005/0246221 A1 | 11/2005 | Geritz et al. |
| 2005/0283395 A1 | 12/2005 | Lesandrini et al. |
| 2006/0069564 A1 | 3/2006 | Allison et al. |
| 2006/0106675 A1 | 5/2006 | Cohen et al. |
| 2006/0173838 A1 | 8/2006 | Garg et al. |
| 2006/0212362 A1* | 9/2006 | Donsbach et al. .............. 705/26 |
| 2006/0218156 A1* | 9/2006 | Schechinger et al. ......... 707/100 |
| 2006/0247946 A1* | 11/2006 | Gordon ............................. 705/1 |
| 2006/0277290 A1 | 12/2006 | Shank |
| 2007/0078833 A1 | 4/2007 | Chea et al. |
| 2008/0082499 A1 | 4/2008 | Koski |

OTHER PUBLICATIONS

Epinions, Screenshots of www.epinions.com, 1999-2004, 25 pages, retrieved Jun. 2004 from web.archive.org.

* cited by examiner

| Brand Summary for Kitchen Ranges | | | | |
|---|---|---|---|---|
| | Visigoth | Super Fondue Systems | Lemur Range | } 132 |
| | Premier brand that combines outstanding function with professional design | Precision controls to manage the quality of your heat; nothing boils faster or simmers lower | Heavy duty cooking equipment for the professional chefs and the food service industry | } 134 |
| *Differences are highlighted in green* | | | | |
| Top Consumer Votes | | | | |
| PROS | Beautiful design (124) | Beautiful design (134) | Beautiful design (186) | |
| | High quality (76) | High quality (76) | High quality (76) | |
| | Intuitive controls (115) | | Intuitive controls (76) | |
| | | Great Temp Control (345) | | |
| | Easy clean cooktop (35) | Easy clean cooktop (65) | | |
| | | | Heavy duty (165) | |
| CONS | Very expensive (54) | Very expensive (123) | Very expensive (87) | } 130 |
| | Difficult installation (23) | Difficult installation (45) | | |
| | | | Easy to scratch top (125) | |
| KITCHEN STYLE | Mission (25) | Mission (12) | Mission (15) | |
| | Professional (67) | Professional (167) | Professional (237) | |
| | Chef's (156) | Chef's (146) | Chef's (96) | |
| | | | Country (45) | |
| | | Modern (34) | | |
| Recent Consumer Comments | | | | |
| | Beautiful Range *by Pro Chef* The oven will fit four full size cookie sheets with no problem. The burners are heavy (cast iron); large enough to hold 13" fry pans. The griddle cover is the same height as burners so pots can slide from burner to cover. | Fantastic range *by Gourmet Mom* If you are looking for a piece in your kitchen that will have every visitors attention, this is it. Outstanding. Comes with both island trim and stainless back splash. Looks wild as a slide in. | Great Stove, Great Features *by Home Chef* The oven will fit four full size cookie sheets with no problem. The burners are heavy (cast iron) and large enough to hold 13" fry pans and pots. The griddle cover is the same height as the burners. | } 140 |
| | Fantastic range *by Gourmet Mom* If you are looking for a piece in your kitchen that will have every visitors attention, this is it. It is truly a beautiful design and visually, just stunning. | | Fantastic range *by Gourmet Mom* It is truly a beautiful design and visually, just stunning. It has just the right mix of pro/bare bones styling with the right artistic features that make it truly decorative. | |

*FIG. 2*

Select keywords below to filter products results:

| Include these keywords (302) | Exclude these keywords (304) |
|---|---|
| breathable  casual day wear  comfortable  *durable* (312)  *hiking* (314)  lightweight  mountaineering  waterproof  raingear | expensive  poor quality fabric  *tears easily* (316) |

▰▰▱▱▱▱▱ (310) 12 of 47 products matched your keywords
0   12      47

Results matching your keywords: (320)
[Include "durable, hiking"] [exclude: "tears easily"]

1. Northface Denali Jacket ★★★★☆
Features smart styling and a versatile liner jacket can be worn alone or zipped into the waterproof, breathable shell.

2. Mountain Hardware Alpine Jacket ★★★★☆
Snowriders everywhere will appreciate the relaxed fit and solid protection of this technically advanced jacket for the most demanding conditions.

3. Arc'Teryx Anorak Jacket ★★★★☆
Features smart styling and a versatile liner jacket can be worn alone or zipped into the waterproof, breathable shell.

4. NorthFace Everest Jacket ★★★★☆
Snowriders everywhere will appreciate the relaxed fit and solid protection of this technically advanced jacket for the most demanding conditions.

Page 1 2 3 (322)

*FIG. 3*

Select keywords below to filter products results:

| Include these keywords | Exclude these keywords |
|---|---| breathable            casual day wear comfortable   ▨durable▨   ▨hiking▨ lightweight
                      mountaineering
▨waterproof▨ ~330
                      raingear expensive poor quality fabric ▨tears easily▨

■■■■■□□□□□□□  5 of 47 products matched your keywords
0    5              47

Results matching your keywords:
[Include: "durable, hiking, waterproof"] [exclude: "tears easily"]

1. Marmot All-Weather Jacket ★★★★☆
A wonderful travel jacket that will protect you from the elements without weighing you or your pack down

2. MountainGear Traveler Jacket ★★★★★
Skiers everywhere will appreciate the slim fit and waterproof protection of this advanced jacket for the most inclement conditions.

3. Arc'Teryx Anorak Jacket ★★★★☆
Features smart styling and a versatile liner jacket can be worn alone or zipped into the waterproof, breathable shell.

4. Mountain Hardware Alpine Jacket ★★★★☆
Snowriders everywhere will appreciate the relaxed fit and solid protection of this technically advanced jacket for the most demanding conditions.

Page 1 2

*FIG. 4*

CONSUMER PRODUCT REVIEW SYSTEM USING A COMPARISON CHART

CROSS REFERENCES TO RELATED APPLICATIONS

This application is a continuation of the following application, U.S. patent application Ser. No. 11/474,097, entitled SYSTEM FOR DYNAMIC PRODUCT SUMMARY BASED ON CONSUMER-CONTRIBUTED KEYWORDS, filed on Jun. 22, 2006 now U.S. Pat. No. 7,620,651, which is hereby incorporated by reference, as if it is set forth in full in this specification.

CLAIM OF PRIORITY AND REFERENCE TO RELATED APPLICATIONS

This application claims priority from the following, each of which is incorporated by reference as if set forth in full in this application:

U.S. Provisional Patent Application Ser. No. 60/736,969 filed on Nov. 15, 2005 entitled "PRODUCT COMPARISON CHART BASED ON A QUALITATIVE CONSUMER VOCABULARY, A METHOD FOR COMPARING TWO OR MORE PRODUCTS BASED ON CRITERIA FROM CONSUMER-CONTRIBUTED WORDS AND/OR PHRASES"; and U.S. Provisional Patent Application Ser. No. 60/741,413 filed on Dec. 1, 2005 entitled "DYNAMIC PRODUCT SUMMARY BASED ON CONSUMER-CONTRIBUTED KEYWORDS".

This application is related to co-pending U.S. patent application Ser. No. 11/474,095 filed on Jun. 22, 2006 entitled "SYSTEM FOR OBTAINING REVIEWS USING SELECTIONS CREATED BY USER BASE" which is hereby incorporated by reference as if set forth in full in this application for all purposes.

BACKGROUND OF THE INVENTION

This invention relates in general to digital processing systems and more specifically to a system for presenting, comparing and employing user-generated keywords for use in online product reviews.

Consumer opinions are useful to manufacturers, sellers, marketers and other participants in a commercial supply chain so that the participants may more effectively create, advertise and sell products and services. Knowledge of opinions can also be useful in many other areas such as opinion polls for government candidates, popularity of proposed laws; predicting financial securities, obtaining knowledge of social issues, etc.

Digital communication networks, such as the Internet, and popular presentation formats such as Hyper-Text Markup Language (HTML) as used on the World Wide Web ("web") have provided many benefits for gathering opinions of consumers. The Internet allows efficient gathering of consumer opinions in the form of, for example, product reviews, brand rating, service reviews, etc. Users of computer systems are presented with a page that allows a user to type in a product review. The review can be read by an administrator and used to compile statistical information about the product.

Tabulated information for use in consumer product purchasing can include "specification-based information" such as specific facts about the product or service (technical specifications, features, etc.), calculated data (overall user "star rating," price, etc.) and/or qualitative information that is determined by an expert, manufacturer, or other official source. Such specification based information is often obtained from a human expert, manufacturer, or other official source. While specification based information can be useful to consumers it may also present drawbacks since some consumers might not be able to easily interpret the specification-based criteria properly. Also, expert-based qualitative criteria may not be as accurate as consumer-provided criteria since it is largely or exclusively dependent upon one or a few people and the decision to define the criteria is made at a past point in time.

Reviews are often sought by shoppers to help make an informed decision about buying a product or service. It is desirable to provide an efficient interface to present reviews to users and to help users to shop effectively.

SUMMARY OF EMBODIMENTS OF THE INVENTION

A preferred embodiment of the invention displays user-created keywords that are used in item reviews to describe or rate an item. The keywords are rated by user voting. The keywords, along with the associated ratings, are displayed for further use by users in creating other reviews of the product. The keywords and ratings are also used in a display of reviews of the product. The keywords and ratings can be categorized according to the type of attributes (e.g., "pro," "con," etc.) in which the keywords are used.

In one embodiment, each keyword is associated with a rating that is referred to as a "use value." The use value indicates the number of times that the keyword was used in a review. The use in a review represents a "vote" by a user. In other words, every time a user selects a keyword as appropriate to describe the product, the use value increases. In this manner the consumer gets an idea about the popularity of the keyword in reviewing a product or products. This can lead to a conclusion that a feature associated with the keyword is important or critical to the value of the product. For example, if a keyword such as "fragile LCD" appears in many reviews then it is likely that the durability of the LCD is a major issue for the product.

Keyword usage can be indicated by other means than a use value, or number. Symbols such as a 5 star rating, two thumbs up, etc., can be used. A meter or bar can be used to indicate a relative ranking depending upon how much of the bar is colored or filled in. Use values can be associated with keywords or other review data or review metrics so that the consumer obtains knowledge about the review metric's popularity in reviewing a product, group or category of products, brand type, service, or other item under consideration.

Details of the benefits of, and methods for, using user-generated keywords in a product review are discussed in the co-pending patent application referenced, above.

Keywords can be tabulated and categorized according to frequency and type of use. Keywords can be linked to a list of specific reviews that use the keyword, or they can be linked to other information about the keyword as, for example, by using hyperlinking in an HTML web page. A link can provide a larger or more complete set of consumer keywords rather than just the most popular ones presented at a high-level page in a review website.

Keywords can be used by a consumer at a website to filter or organize lists of products or other items so that the consumer can make an informed decision about purchasing a product. A comparison chart lists keywords that can be used to select, filter or otherwise organize items. Clicking on a keyword can select or deselect the keyword. Selected keywords can be used in searches or filters to include or exclude items that meet a criterion defined by a rule that uses one or more keywords.

BRIEF DESCRIPTION OF THE DRAWINGS

FIG. 2 is a graphic representation of keywords obtained from consumer opinions that are used to compare brands;

FIG. 3 illustrates using keywords in searches to filter product search results;

FIG. 4 illustrates further steps in filtering of product search results;

DETAILED DESCRIPTION OF EMBODIMENTS OF THE INVENTION

User-generated keywords are typically created by users during the course of preparing or submitting a product review online. A keyword can include one or more words, phrases, alphanumeric or symbolic characters, image or audio information or other means of conveying information. Details of generation, use and management of keywords are included in the co-pending patent application referenced, above. User generated keywords provide advantages to shoppers because they can be changed to reflect current views on products and can be used to obtain more statistically meaningful results by enforcing consistent word or phrase descriptions among many reviewers. Other benefits are also described in the co-pending patent application.

Figure 1:
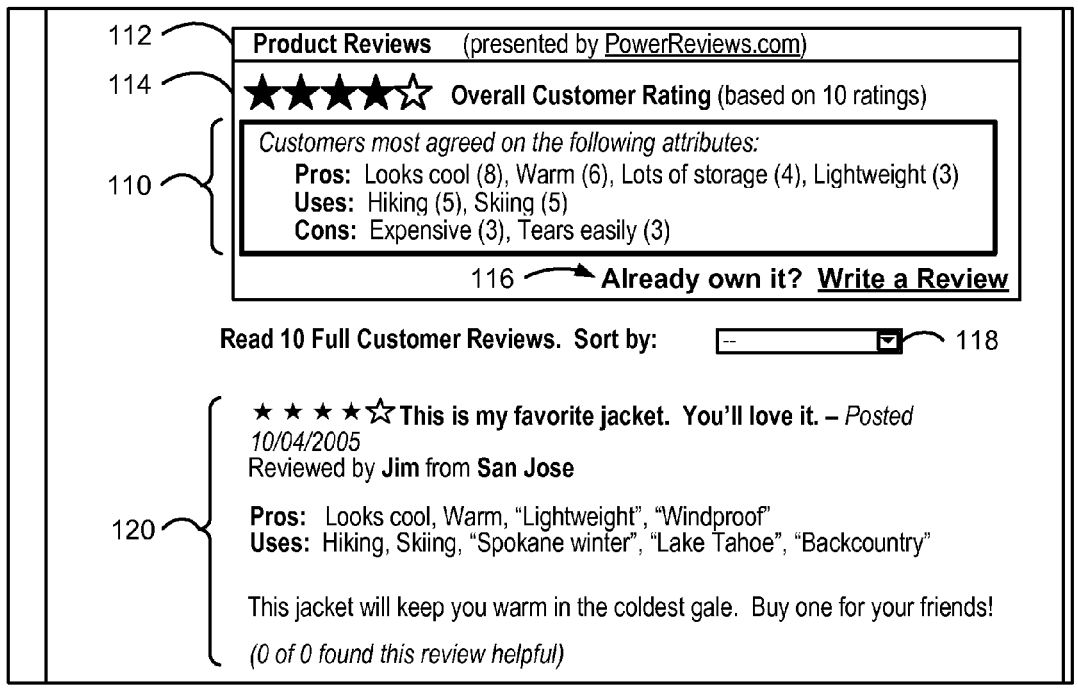
FIG. 1 shows an exemplary process for displaying reviews.

FIG. 1 shows an example of a portion of a web page that displays a consumer keyword-based tabulated dynamic summary for a clothing product (in this case, a jacket). Keywords such as "Looks cool," "Hiking" and "Expensive" at 110 are shown associated with three different categories labeled "Pros," "Uses" and "Cons," respectively. Other keywords include "Warm" "Lots of storage," "Lightweight," "Skiing" and "Tears easily." Following each keyword is a number referred to as a "use value". The use value shows the number of times that each keyword has been used in a review within the particular category. The same keyword can be used in multiple categories. In this case a different use value can be associated with the keyword for each different category. Naturally, any number of keywords and categories can be used.

The keywords and use values are automatically updated as keywords are used in a review, removed from use in a review, created, deleted or otherwise managed. Updating can be near real-time or almost instantaneous, or updates can be performed at intervals (e.g., hourly, daily, monthly, etc.), at a predetermined time, or in accordance with other schemes. New phrases and terms like "windproof and breathable" or "waterproof" may appear over time, and may either replace some current keywords or be appended to the list of keywords.

Users can "vote" on a keyword to indicate that they think it is particularly relevant or useful in a review. The use value includes the number of actual votes received for a keyword. Other ways of voting on, rating or ranking keywords can be used. Multiple use values can be shown for a given keyword as, for example, where there are multiple categories of voting such as votes obtained in the current month and votes obtained prior to the current month.

FIG. 1 only shows the most popular keywords receiving the most number of uses or votes. Other embodiments can include a complete list of keywords, a listing of a different portion of keywords (e.g., most commonly used within a recent time period, least commonly used, etc.). A methodology or rule for selecting keywords for display may change over time. For example, a list of keywords may be completely cleared so that an entirely new keyword ranking can be initiated.

In FIG. 1, an overall rating of the product is provided visually (e.g., up to 5 stars) at 114. The ability for a user to write a review is provided by a link at 116. Clicking this link takes the user to another web page (not shown) where the user can create a review and can optionally use one or more of the keywords from the list at 110, create new keywords, vote on keywords or perform other operations. The drop-down box at 118 allows the user to sort and display user reviews according to a criterion such as most recent reviews, helpfulness ("was this review helpful to you?"), highest rated, etc. An example review is shown at 120.

In the example in FIG. 1, a user can click on any keyword, such as "Lightweight" and see a list of reviews or the text of actual reviews that contain that keyword. This enables a user to see the context (in the form of a full review) behind the keyword.

FIG. 2 shows another portion of a web page that provides a brand name rating summary for kitchen range manufacturers. The summary is based on qualitative user-created keywords rated according to user voting. A user browsing a web site selects a page related to one or more products, brand names, services or other items (e.g., person, event, etc). A summary of tabulated, dynamic keywords is displayed at 130 in association with selected items. In FIG. 2, the selected items are three brand names of kitchen range manufacturers shown at 132. A short description of each brand name is shown at 134. This type of display presents information in a way that is easy for a user to quickly understand key terms and phrases from a collection of consumer opinions. The consumer-generated keywords are associated with products, or items. Data about the items can be maintained in and obtained from different database systems. As demonstrated in FIG. 2, the consumer keywords may be grouped into one or more categories of criteria that identify the "Pros" (i.e., benefits), "Cons" (i.e., drawbacks), and "Kitchen Style" of the products. Reviews for products provided by each brand manufacturer are shown at 140.

Various aspects of the invention can be used with other methods of obtaining and presenting consumer reviews and pre-made tags. For example, consumers post opinions about products and services through various mechanisms such as blogs, bulletin boards, and product reviews.

Although FIG. 2 shows brand names being compared, items that can be compared include products, services, brands or any other thing that can be a subject of a comparison. The criteria within the rows, such as the "Pros" and "Cons" categories, would include qualitative, consumer-contributed terms relevant to the items or subjects. The criteria are automatically updated as the consumer vocabulary grows. Ratings or review information can include other indicators such as a "star rating" (e.g., 3 out of 4 starts), a meter bar, etc. Indicators and ratings can show the results of users voting on a product. User data acquired in different ways (such as counting positive and negative reviews) can be used to derive, in whole or in part, suitable types of ratings. Other types of categories such as uses, benefits, drawbacks, style, lifestyle, fit, sizing, etc. can be displayed in rows and associated usage and other criteria can be displayed in association with each category.

FIG. 3 shows a portion of a web page to illustrate using user-created keywords to select, filter or manage lists of products for purchase consideration. In FIG. 3, keywords for user selection are presented in inclusion box 302 and exclusion box 304. Products are searched and displayed according to whether selected keywords are present in reviews associated with the products. Only products that have reviews that include the selected keywords in inclusion box 302 will be displayed. Similarly, the displayed products must also not have reviews associated with them that use keywords selected in exclusion box 304.

In FIG. 3, the keywords "durable" 312 and "hiking" 314 are selected for inclusion. Keyword "tears easily" 316 is selected for exclusion. Other methods of selecting and displaying keywords to be used as search or filter criteria are possible.

Status bar 310 indicates that 12 of 47 products match the conditions or criteria defined by the selected keywords in the inclusion and exclusion boxes. Other types of conditions, criteria or rules can be used to perform the filtering. For example, Boolean or logical expressions can be formed with keywords and used as search or filter criteria.

A list of the products that satisfy the criteria is shown beginning at 320. Additional pages of products satisfying the criteria are included in pages 2 and 3 and are accessible by links to the pages at 322.

FIG. 4 shows a result of selecting another keyword for inclusion. In FIG. 4, keyword "waterproof" 330 has been selected which has reduced the number of "hits" or products that satisfy the criteria to 5. The criteria now require that a product have reviews that include keywords "durable," "hiking" and "waterproof" but that exclude keyword "tears easily." Other ways of including or excluding keywords for searches are possible. For example, a single list of the keywords can be used where clicking on a keyword alternately changes its status to be "included," "excluded" or "not used" in a search.

In an embodiment of the invention an icon or "badge" is used to show that a review was created by a "verified purchaser." A verified purchaser is a person who is known with some degree of certainty to have purchased the product that is the subject of the review. A preferred embodiment uses email verification that includes several steps. (1) At a time of purchase of a product the purchaser is asked to provide an email address. (2) At a later time an email request is sent to the purchaser at the provided address. The email allows the purchaser to optionally create a review using a clickable Uniform Resource Locator (URL) address embedded in the email. If the purchaser clicks the link a web page is displayed that allows entry of a review. (3) By using a unique identifier passed to a web page server at a time of processing the clicked hyperlink the server is able to associate the review submitted via the hyperlink with the purchaser. (4) A review record created by using the hyperlink is then provided with a verified purchaser tag.

Whenever the review is displayed it is marked with the badge. Readers of the review can decide whether to give more credibility to reviews from verified purchasers since it is likely that the review is from a consumer who has likely purchased the product under review. Other mechanisms can be used to determine if a review is from an actual purchaser. For example, a user account can be created where each user is provided with a password, logon, etc. Purchases through the account can be tracked and if a review is written from that account about a product, service, or other item that has been purchased through that same account then the review can be deemed worthy of the verified purchaser badge. Other purchase verification approaches are possible.

A badge can be an icon, text, symbol or other graphic placed on the screen in proximity to or in association with a review, a reviewer's name, or other information created by a person who has been determined to be likely to have purchased a product. In general, any type of indicator can be used to mark a review from a verified purchaser such as animation, color, font size, review or author name placement (e.g., indenting, ordering a list of reviews), etc.

Figure 5:
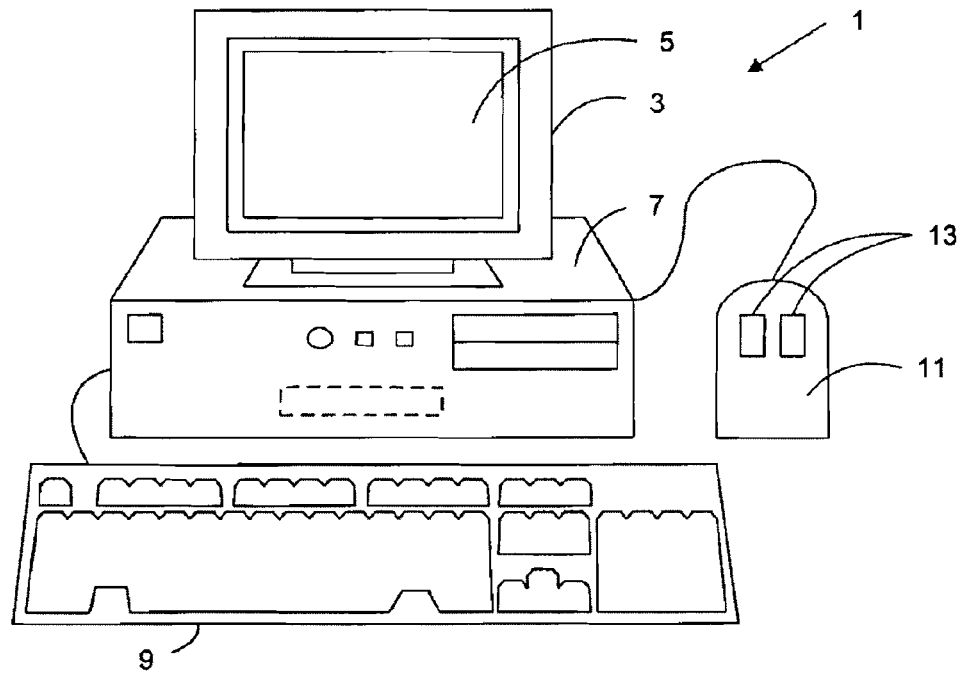
FIG. 5 shows a computer system suitable for use with the present invention.
Figure 6:
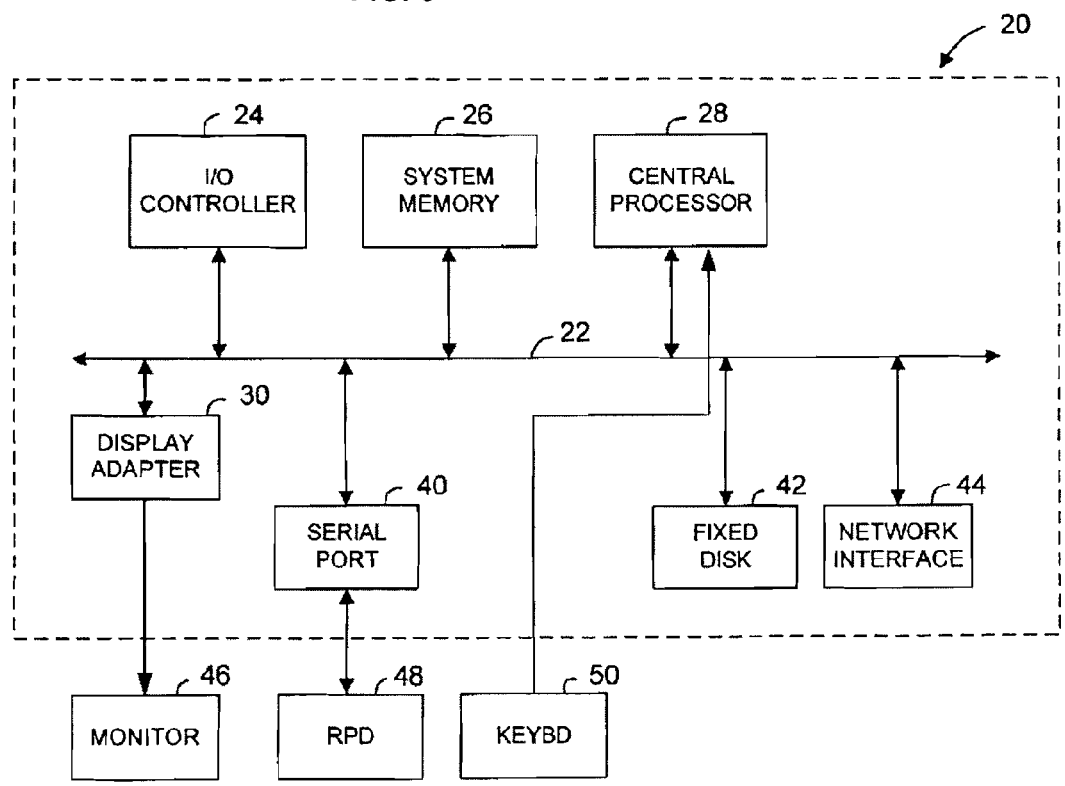
FIG. 6 shows basic subsystems in the computer system of FIG. 6.
Figure 7:
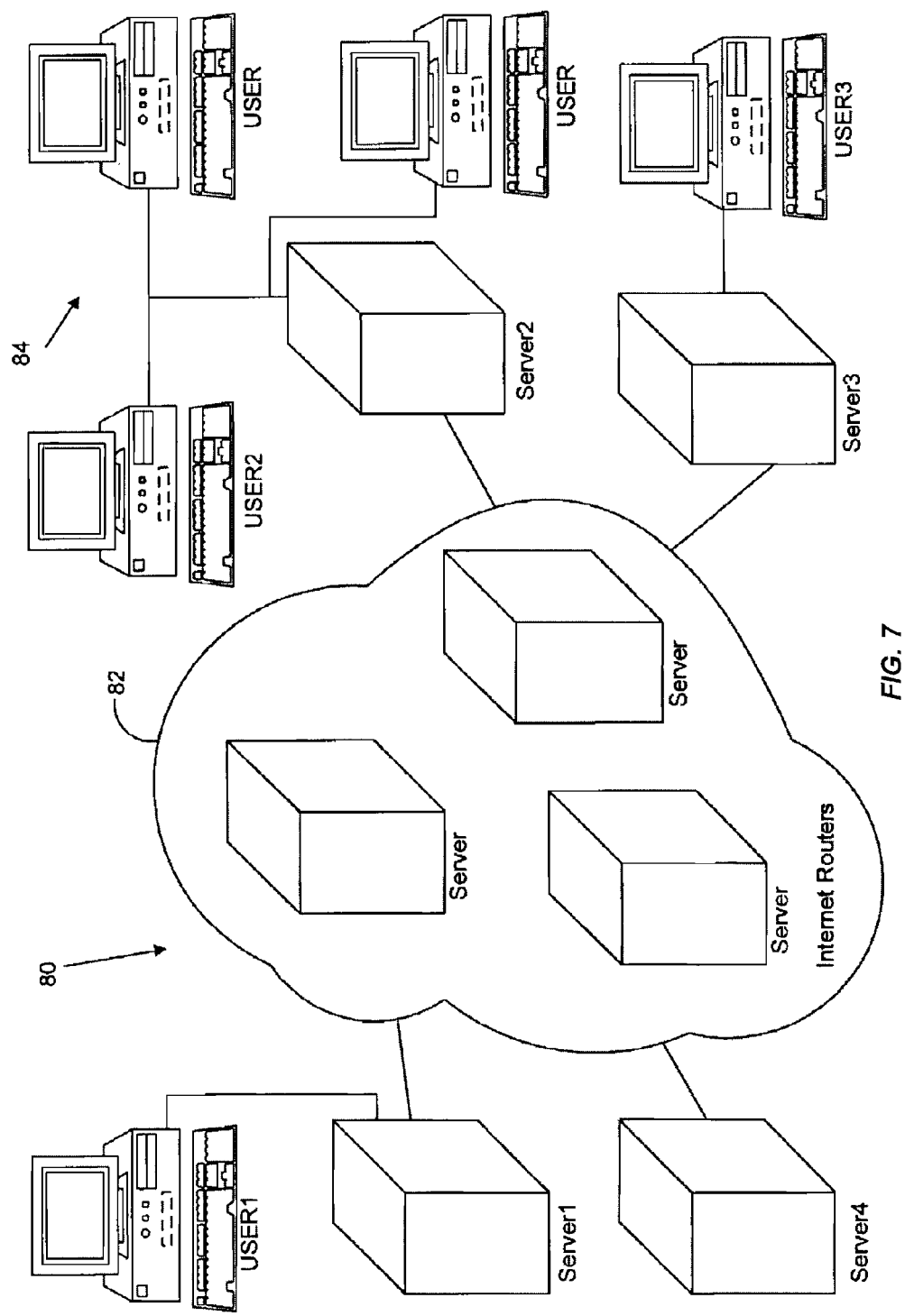
FIG. 7 is a generalized diagram of a typical computer network suitable for use with the present invention.

FIGS. 5-7 illustrate basic hardware components suitable for practicing the present invention.

FIG. 5 is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touchscreen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 6 illustrates subsystems that might typically be found in a computer such as computer 1.

In FIG. 6, subsystems within box 20 are directly interfaced to internal bus 22. Such subsystems typically are contained within the computer system such as within cabinet 7 of FIG. 5. Subsystems include input/output (I/O) controller 24, System Memory (or random access memory "RAM") 26, central processing unit CPU 28, Display Adapter 30, Serial Port 40, Fixed Disk 42, Network Interface Adapter 44. The use of bus 22 allows each of the subsystems to transfer data among subsystems and, most importantly, with the CPU. External devices can communicate with the CPU or other subsystems via bus 22 by interfacing with a subsystem on the bus. Thus, Monitor 46 connects with Display Adapter 30, a relative pointing device (e.g. a mouse) connects through Serial Port 40. Some devices such as Keyboard 50 can communicate with the CPU by direct means without using the main data bus as, for example, via an interrupt controller and associated registers.

As with the external physical configuration shown in FIG. 5, many subsystem configurations are possible. FIG. 6 is illustrative of but one suitable configuration. Subsystems, components or devices other than those shown in FIG. 6 can be added. A suitable computer system can be achieved without using all of the subsystems shown in FIG. 6. For example, a standalone computer need not be coupled to a network so Network Interface 44 would not be required. Other subsystems such as a CDROM drive, graphics accelerator, etc. can be included in the configuration without affecting the performance of the system of the present invention.

FIG. 7 is a generalized diagram of a typical network.

In FIG. 7, network system 80 includes several local networks coupled to the Internet. Although specific network protocols, physical layers, topologies, and other network properties are presented herein, the present invention is suitable for use with any network.

In FIG. 7, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line.

Similarly, other computers at 84 are shown utilizing a local network at a different location from USER1 Computer. The computers at 84 are coupled to the Internet via Server2. USER3 and Server3 represent yet a third installation.

Although embodiments of the invention have been discussed primarily with respect to specific arrangements, formats, protocols, etc. any other suitable design or approach can be used. For example, keywords can be created, presented and selected in any suitable manner. Keywords can be organized or presented as a list, menu, array, tree hierarchy or other assortment. Radio buttons, check boxes, selection highlighting, animating, drag and drop, or any other form of selection can be used.

In general, voting or rating can include any way of obtaining a user's indication that a keyword is preferred or more useful in a review. For example, voting can include assigning a preference value from 1-10 to a keyword, rearranging a list of keywords as most to least preferential, etc.

Note that although specific controls and mechanisms for obtaining user input have been described that any manner of effectively obtaining user input can be used, as desired. For example, although mouse/pointer and keyboard input selection and entry have been described, any other user input device such as a trackball, digitizing tablet, voice recognition, stylus, keypad, data glove, etc., can be used. Any type of displayable or discrete controls can be used to accept user input. Any type or format of presentation of information is possible such as video, graphical, three-dimensional, virtual reality, audio or audio-only presentation, etc. can be used. Visual depictions such as symbols, graphs, charts, etc. can be used to show qualities or values.

The embodiments described herein are merely illustrative, and not restrictive, of the invention. For example, the network may include components such as routers, switches, servers and other components that are common in such networks. Further, these components may comprise software algorithms that implement connectivity functions between the network device and other devices.

Any suitable programming language can be used to implement the present invention including C, C++, Java, assembly language, etc. Different programming techniques can be employed such as procedural or object oriented. The routines can execute on a single processing device or multiple processors. Although the flowchart format demands that the steps be presented in a specific order, this order may be changed. Multiple steps can be performed at the same time. The flowchart sequence can be interrupted. The routines can operate in an operating system environment or as stand-alone routines occupying all, or a substantial part, of the system processing. Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for comparing two or more products, the method executing in a system that includes a processor coupled to a display and to a user input device, the method comprising:
   accepting a signal from the user input device to select two or more products;
   displaying items in a table on the display screen, wherein the items include an indication of the two or more products, wherein the items are arranged along a first side of the table;
   displaying two or more keyboard categories along a second side of the table;
   displaying user-generated keywords within the table, wherein the user-generated keywords describe a user opinion of an item, wherein each keyword of a particular keyword category that is associated with a particular item is displayed in an area that intersects a row and column defined by the particular keyword category and by the particular item, wherein if a keyword is common to multiple areas the keywords are further arranged to be in a common horizontal or vertical alignment within the table; and
   displaying a keyword usage indicator adjacent to at least one keyword, wherein the keyword usage indicator indicates a popularity of the keyword used in a review.

2. The method of claim 1, further comprising:
   detecting when a same keyword is used for all items; and
   using a visual indicator to indicate the same keyword.

3. The method of claim 2, wherein highlighting is used to indicate the same keyword.

4. The method of claim 2, wherein coloring is used to indicate the same keyword.

5. The method of claim 1, wherein the items include a brand name.

6. The method of claim 1, wherein the items include a service description.

7. The method of claim 1, wherein a keyword category includes "Pros".

8. The method of claim 1, wherein a keyword category includes "Cons".

9. The method of claim 1, further comprising:
   listing one or more comments adjacent to the table.

10. An apparatus for comparing two or more products, the apparatus comprising:
    a processor;
    a display coupled to the processor;
    a user input device;
    a processor-readable storage device including one or more instructions executable by the processor for
    accepting a signal from the user input device to select two or more products;
    displaying items in a table on the display screen, wherein the items include an indication of the two or more products, wherein the items are arranged along a first side of the table;
    displaying two or more keyboard categories along a second side of the table;
    displaying user-generated keywords within the table, wherein the user-generated keywords describe a user opinion of an item, wherein each keyword of a particular keyword category that is associated with a particular item is displayed in an area that intersects a row and column that is associated with a particular item is displayed in an area that intersects a row and column defined by the particular keyword category and by the particular item, wherein if a keyword is common to multiple areas the keywords are further arranged to be in a common horizontal or vertical alignment within the table; and
    displaying a keyword usage indicator adjacent to at least one keyword, wherein the keyword usage indicator indicates a popularity of the keyword used in a review.

11. A processor-readable storage device including instructions for a method for comparing two or more products, the processor-readable storage device comprising one or more instructions for:
    accepting a signal from the user input device to select two or more products;
    displaying items in a table on the display screen, wherein the items include an indication of the two or more products, wherein the items are arranged along a first side of the table;

displaying two or more keyword categories along a second side of the table;

displaying user-generated keywords within the table, wherein the user-generated keywords describe a user opinion of an item, wherein each keyword of a particular keyword category that is associated with a particular item is displayed in an area that intersects a row and column defined by the particular keyword category and by the particular item, wherein if a keyword is common to multiple areas the keywords are further arranged to be in common horizontal or vertical alignment within the table; and displaying a keyword usage indicator adjacent to at least one keyword, wherein the keyword usage indicator indicates a popularity of the keyword used in a review.

* * * * *